United States Patent
Clark (10) Patent No.: US 11,041,583 B2
(45) Date of Patent: Jun. 22, 2021

(54) DUCT COUPLING

(71) Applicant: Design-Tek Tool and Plastics, Inc., Ogden, UT (US)

(72) Inventor: Brent L. Clark, West Haven, UT (US)

(73) Assignee: Brent L. Clark, Ogden, UT (US)

( * ) Notice: Subject to any disclaimer, the term of this patent is extended or adjusted under 35 U.S.C. 154(b) by 968 days.

(21) Appl. No.: 15/081,587

(22) Filed: Mar. 25, 2016

(65) Prior Publication Data
US 2017/0276276 A1    Sep. 28, 2017

(51) Int. Cl.
*F16L 37/091* (2006.01)
*D06F 58/20* (2006.01)

(52) U.S. Cl.
CPC ............ *F16L 37/091* (2013.01); *D06F 58/20* (2013.01)

(58) Field of Classification Search
CPC ... F16L 37/091; F16L 37/098; F16L 37/3985; F16L 37/0987; F16L 37/0985
USPC ....... 285/257, 424, 243, 314, 322–323, 903; 248/74.3
See application file for complete search history.

(56) References Cited

U.S. PATENT DOCUMENTS

| | | | | |
|---|---|---|---|---|
| 2,142,768 A | * | 1/1939 | Tompkins | F16L 33/2076 285/257 |
| 2,739,615 A | | 3/1956 | Wurzel | |
| 2,921,606 A | * | 1/1960 | McCauley | F16L 47/26 138/107 |
| 3,019,038 A | * | 1/1962 | Cline | F16L 33/221 285/243 |
| 4,212,487 A | * | 7/1980 | Jones | F16L 33/225 285/243 |
| 4,299,414 A | * | 11/1981 | Bachmann | F16L 51/021 285/187 |
| 4,599,784 A | * | 7/1986 | Canu, Jr. | F16L 11/112 29/450 |
| 4,705,304 A | * | 11/1987 | Matsuda | F16L 25/0036 285/243 |
| 4,903,942 A | * | 2/1990 | Licciardello | F16L 37/0985 251/149.1 |
| D342,782 S | | 12/1993 | Anderson et al. | |
| 5,921,592 A | | 7/1999 | Donnelly | |
| 7,036,850 B2 | | 5/2006 | Gill | |
| 7,530,606 B1 | * | 5/2009 | Yang | F16L 37/0915 285/308 |
| 7,532,966 B2 | * | 5/2009 | Blundell | B62D 5/0472 180/400 |
| 8,033,578 B2 | | 10/2011 | De Wilde | |
| 8,336,923 B2 | | 12/2012 | Vautour | |
| 2010/0031527 A1 | | 2/2010 | Robinson et al. | |

(Continued)

*Primary Examiner* — Matthew Troutman
*Assistant Examiner* — Fannie C Kee
(74) *Attorney, Agent, or Firm* — Dentons Durham Jones Pinegar; Sarah W. Matthews (57) ABSTRACT

A duct coupling system that is capable of coupling two ducts, such as a clothes dryer exhaust duct and a flexible helical clothes dryer duct that is connected to a wall vent. The duct coupling includes a first duct adapter with a first end to concentrically mate with the first duct, and a second end with a plurality of tines to flexibly bend toward the inner surface of the first duct adapter, such that the first duct that is concentrically mated with the first duct adapter is disposed between an inner surface of the plurality of tines and the inner surface of the first duct adapter toward which the plurality of tines flexibly bend.

16 Claims, 9 Drawing Sheets

(56) References Cited

U.S. PATENT DOCUMENTS

2012/0074689 A1  3/2012  Petersen et al.
2014/0049043 A1  2/2014  Hamman, Jr. et al.

\* cited by examiner

DUCT COUPLING

FIELD OF THE INVENTION

The present invention relates generally to a duct coupling system for coupling two ducts together. The present invention is more particularly related to a duct coupling system for coupling a clothes dryer exhaust to a duct hose connected to a wall vent.

BACKGROUND

Various systems and methods have been disclose in the prior art to join ducts together, in particular to join a clothes dryer exhaust to a duct hose connected to a wall vent. Some systems and methods utilize ring-style clamps or threaded connections to attach a duct hose to a clothes dryer exhaust, which require tools and effort to screw parts together, such as shown in U.S. Pat. No. 8,336,923. Other systems utilize one-way tongues that allow insertion of one duct within another duct but prevent the reverse motion, such as shown in U.S. Pat. Nos. 2,739,615; 8,033,578; 5,921,592; and US Patent Publication No. 2012/0074689. Still, other systems provide for a frictional fit, such as shown in US 2014/0049043, which may not provide sufficient pressure to assure that the duct coupling remains intact.

Accordingly, there is a need for improved duct couplings, which can be used to simplify the process of joining and strengthen the coupling joining two ducts together.

SUMMARY OF THE INVENTION

The present invention relates to a duct coupling for reversibly joining a first duct and a second duct, comprising a first duct adapter comprising a duct having an inner surface, outer surface, first duct end and first coupling end, wherein the first duct end is configured to concentrically mate with the first duct; a second duct adapter comprising a duct having an inner surface, outer surface, second duct end and second coupling end, wherein the second duct end is configured to mate with the second duct, and wherein the first duct adapter coupling end is configured to concentrically mate with the second duct adapter coupling end; wherein the first coupling end comprises plurality of tines configured to flexibly bend toward one of the inner surface and outer surface of the first duct adapter, such that the first duct that is concentrically mated with the first duct adapter is disposed between an inner surface of the plurality of tines and one of the inner surface or outer surface of the first duct adapter toward which the plurality of tines flexibly bends; and wherein the second coupling end is configured to concentrically mate with the first coupling end so as to force the plurality of tines to clamp against the first duct that is disposed between an inner surface of the plurality of tines and one of the inner surface or outer surface of the first duct adapter toward which the plurality of tines flexibly bends.

In one embodiment, the plurality of tines are connected to the first duct adapter coupling end via a flexible hinge. For example, in one particular embodiment, the flexible hinge further comprises a thinned region of flexible material. In some embodiments, the plurality of tines are manufactured in a position pointing radially inwardly.

In another aspect of the invention, the inner surface of one or more of the plurality of tines further comprises one or more friction ridge configured to clamp against the first duct that is concentrically mated with the first duct end and disposed between the inner surface of the plurality of tines and one of the inner surface or outer surface of the first duct adapter toward which the plurality of tines flexibly bends.

In yet another aspect of the invention, an outer surface of one or more of the plurality of tines further comprises one or more pressure ridges, wherein the pressure ridges are configured to cause the plurality of tines to frictionally engage the first duct concentrically mated with the first duct adapter and disposed between the inner surface of the plurality of tines and one of the inner surface or outer surface of the first duct adapter toward which the plurality of tines flexibly bends.

In one embodiment, the first duct comprises a flexible duct having helical wires, such as a standard flexible helical clothes dryer hose duct. In one specific embodiment, the pressure ridges are configured to be positioned between the helical wires of the flexible duct.

In another embodiment, the height of the one or more pressure ridge is such that the circumference of the surface of the second duct adapter that presses against the plurality of tines is equal to or greater than the circumference defined by a surface of the pressure ridges against which the second duct adapter presses.

In another aspect of the invention, the plurality of tines further comprises a first locking ridge disposed on an outer surface of the plurality of tines, and wherein the second duct adapter coupling end comprises a second locking ridge circumferentially disposed around one of the second duct adapter inner surface and second duct adapter outer surface that engages the plurality of tines, wherein the first locking ridge is configured to forcibly pass over the second locking ridge and reversibly lock the first duct adapter and second duct adapter together in a concentric mating position.

In one embodiment, one of the first locking ridge and second locking ridge comprises two opposing ridges defining a channel between the two opposing ridges into which channel the other of the first locking ridge and second locking ridge engages.

In another embodiment, one of the first duct adapter and second duct adapter comprises a 90 degree angle between a coupling end and duct end.

In one particular embodiment, the plurality of tines bend inwardly toward the inner surface of the first duct adapter and the second duct adapter is configured to fit inside the first duct adapter and concentrically mate with the inner surface of the first duct adapter.

In another particular embodiment, the plurality of tines bend outwardly toward the outer surface of the first duct adapter and the second duct adapter is configured to fit outside the first duct adapter and concentrically mate with the outer surface of the first duct adapter.

In another aspect, one of the first duct adapter and second duct adapter comprises a flange against which the other of the first duct adapter and second duct adapter abuts to stop axial movement of the first duct adapter and second duct adapter relative to each other. For example, in one embodiment, the flange is disposed around the circumference of one of the first duct adapter and second duct adapter.

BRIEF DESCRIPTION OF THE DRAWINGS

The features and advantages of the invention will become apparent from a consideration of the following detailed description presented in connection with the accompanying drawings in which.

It is appreciated that not all aspects and structures of the present invention are visible in a single drawing, and as such multiple views of the invention are presented so as to clearly show the structures of the invention.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims. Additionally, it should be appreciated that the components of the individual embodiments discussed may be selectively combined in accordance with the teachings of the present disclosure. Furthermore, it should be appreciated that various embodiments will accomplish different objects of the invention, and that some embodiments falling within the scope of the invention may not accomplish all of the advantages or objects which other embodiments may achieve.

The present invention relates to an improved duct coupling system, which can be used, for example, to join a clothes dryer exhaust duct to a hose duct connected to a wall vent. It is understood that the present invention is not limited to any particular application, such as clothes dryer ducts, but rather can be used in any suitable application where it is desirable to join two ducts together.

As described herein and illustrated in the accompanying figures, the present invention relates generally to a duct coupling for reversibly joining a first duct and a second duct.

In one particular embodiment, the duct coupling comprises a first duct adapter and a second duct adapter that reversibly join together. The first duct adapter comprises a duct having an inner surface, outer surface, first duct end configured to join to a first duct and a first coupling end configured to join together with a second duct adapter of the duct coupling system. The first duct end is configured to concentrically mate with the first duct, such as with a standard helically wired hose duct used to connect a clothes dryer duct to a wall vent.

The duct coupling of the present invention further comprises a second duct adapter comprising a duct having an inner surface, outer surface, second duct end for connecting the second duct adapter to a second duct (such as a clothes dryer exhaust duct that vents moisture from a clothes dryer), and a second coupling end for coupling to the second coupling end of the first duct adapter. The first duct adapter coupling end is configured to concentrically mate with the second duct adapter second coupling end, for example, by configuring the second coupling end with a tapered opening that fits within or over the second duct.

The first duct adapter further comprises a plurality of tines hingedly connected to the first duct adapter first coupling end. The plurality of tines is configured to flexibly bend toward either one of the inner surface and outer surface of the first duct adapter, such that the first duct that is concentrically mated with the first duct adapter is disposed between an inner surface of the plurality of tines and one of the inner surface or outer surface of the first duct adapter toward which the plurality of tines flexibly bends.

Accordingly, in one particular embodiment, the plurality of tines bend inwardly toward the inner surface of the first duct adapter and the second duct adapter is configured to fit inside the first duct adapter and concentrically mate with the inner surface of the first duct adapter. In an alternative embodiment the plurality of tines may bend outwardly toward the outer surface of the first duct adapter and the second duct adapter is configured to fit outside the first duct adapter and concentrically mate with the outer surface of the first duct adapter.

Figure 2:
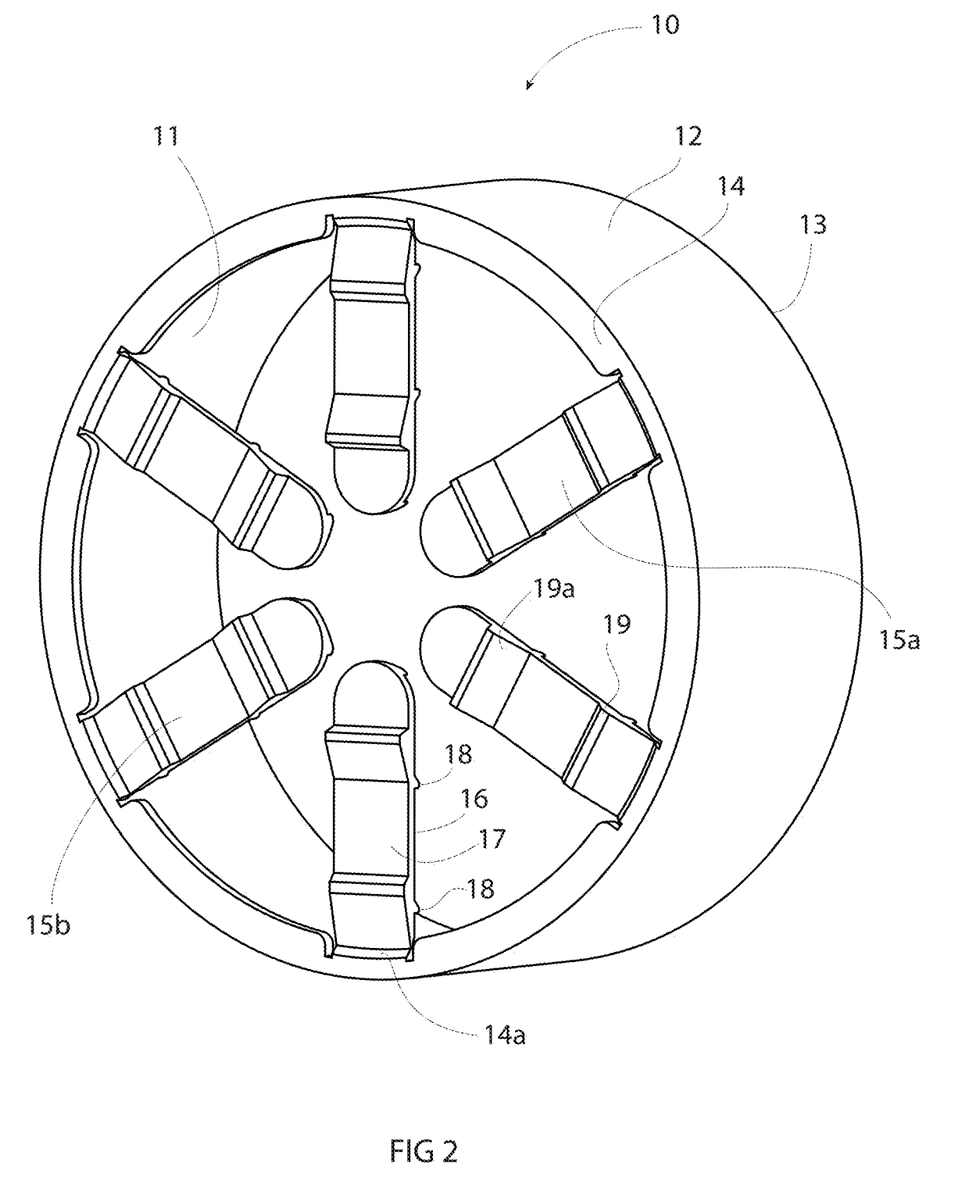
FIG. 2 shows a perspective view of a coupling end of a first adapter.

In one embodiment, the plurality of tines may be connected to the first duct adapter first coupling end via a flexible hinge, for example, a soft malleable plastic material that can bend without breaking the tine off of the first coupling end. In another embodiment, the plurality of tines may be connected to the first duct adapter first coupling end via a more rigid hinge, wherein the tines themselves molded so as to bend backward and lay substantially parallel to the inner surface or outer surface of the first duct adapter, thereby allowing the flexible tine to bend and flex inwardly toward the inner or outer surface of the first duct adapter. In yet another embodiment, the flexible hinge further may comprise a thinned region of flexible material located at the first duct end and configured to allow the plurality of tines to bend backward against and parallel to either the inner or outer surface of the first duct adapter. In yet another embodiment, the plurality of tines are manufactured in a position pointing radially inwardly, as shown in FIG. 2 of the drawings.

In another particular embodiment, as shown in the accompanying figures, the plurality of tines is configured to flexibly bend inwardly toward and parallel to the inner surface of the first duct adapter. When the plurality of tines is configured to flexibly bend inwardly, the second duct adapter will be configured to fit inside the first duct adapter with the tines bent inwardly against the inner surface of the first duct adapter.

In another embodiment, the plurality of tines may be configured to flexibly bend outwardly toward and parallel to the outer surface of the first duct adapter. When the plurality of tines is configured to flexibly bend outwardly, the second duct adapter will be configured to fit outside the first duct adapter with the tines bent outwardly against the outer surface of the first duct adapter.

The second coupling end of the second duct adapter is configured to concentrically mate with the first coupling end, with the distal edge of the second coupling end pushing the plurality of tines to bend back against either the inner or outer surface of the second duct adapter, so as to force the plurality of tines to clamp against a first duct (such as a helical wired clothes dryer hose duct) that is disposed between an inner surface of the plurality of tines and one of the inner surface or outer surface of the first duct adapter toward which the plurality of tines flexibly bends.

Figure 1:
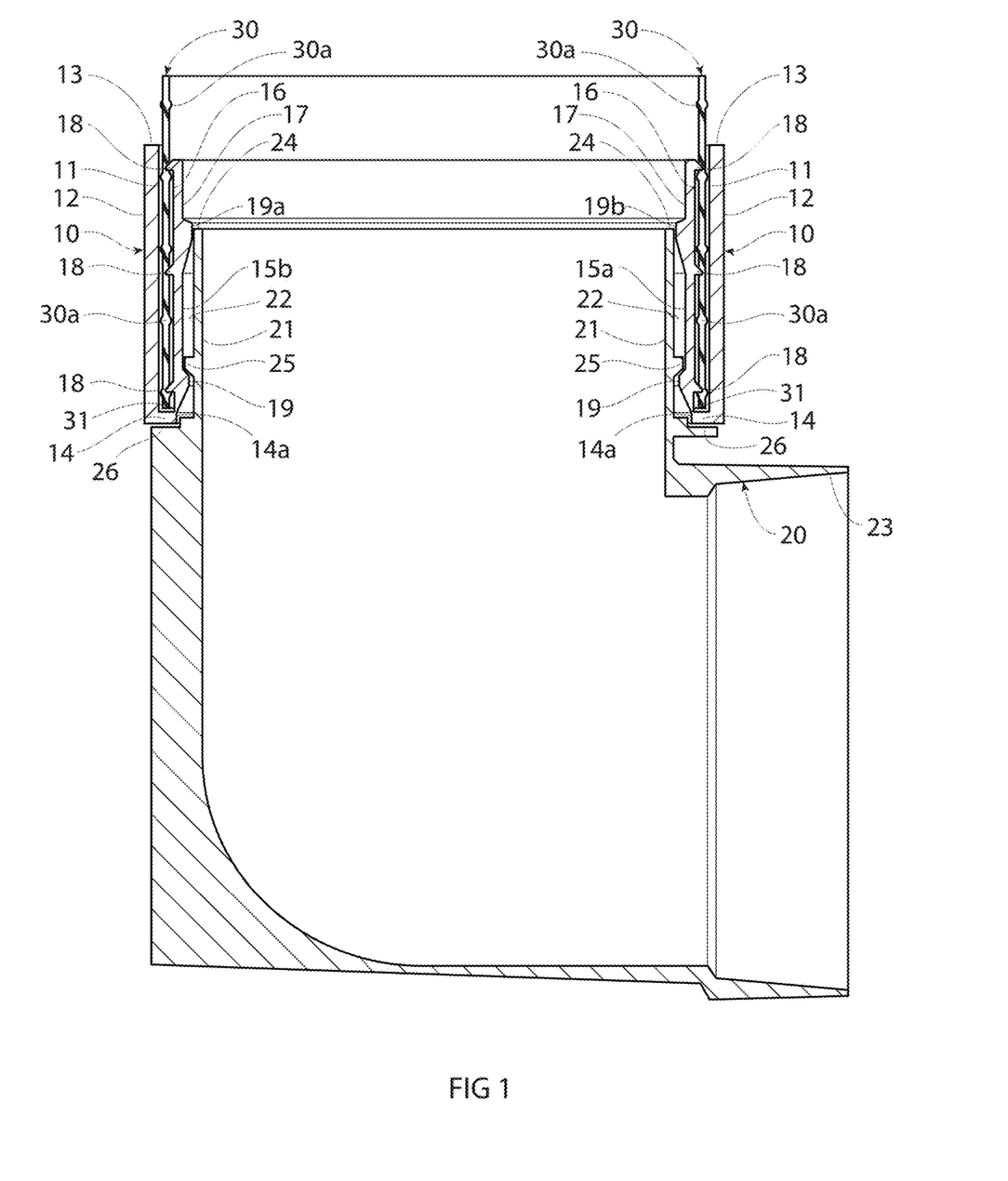
FIG. 1 shows a cross-sectional view of one embodiment of the duct coupling system of the present invention.

In one embodiment, as shown, for example, in FIG. 1, the second coupling end of the second duct adapter is configured to concentrically mate with the inside surface of the first coupling end so as to force the plurality of tines to bend backward and clamp against the inner surface of the first duct that is disposed between the inner surface of the plurality of tines and the inner surface of the first duct adapter toward which the plurality of tines flexibly bends. Alternatively, the second coupling end of the second duct adapter may be configured to concentrically mate with the outside surface of the first coupling end so as to force the plurality of tines to clamp against the outer surface of the first duct that is disposed between the inner surface of the plurality of tines and the outer surface of the first duct adapter toward which the plurality of tines flexibly bends.

In another aspect of the invention, the plurality of tines further comprise one or more friction ridges that facilitate clamping of the tines against a first duct (such as a helical wired clothes dryer hose duct). The inner surface of one or more of the plurality of tines may, for example, comprise one or more friction ridge configured to clamp against the first duct that is concentrically mated with the first duct end and disposed between the inner surface of the plurality of tines and one of the inner surface or outer surface of the first duct adapter toward which the plurality of tines flexibly bends. As used herein, the term "inner surface", when used in reference to the tines, means the surface that engages with and clamps down upon the first duct (such as a helical wired clothes dryer hose duct).

In yet another aspect, the plurality of tines on the first duct adapter may further include outside ridges on the outer side of the tines that is contacted by the second duct adapter. As used herein, in reference to the plurality of tines, the term "outer side" or "outside" surface of the tines refers to the surface that contacts the second duct adapter when the second duct adapter is mated with the first duct adapter. The outside ridges on the outside surface of the tines function to increase the clamping pressure of the tines onto the first duct. The larger the profile of the tines, the more the tines are pushed against toward the inner or outer surface of the first duct adapter and the greater the clamping force of the tines against the first duct that is disposed between the tines and the inner or outer surface of the first duct. For example, in some embodiments the outer surface of one or more of the plurality of tines further comprises one or more pressure ridges, wherein the pressure ridges are configured to cause the plurality of tines to frictionally engage the first duct concentrically mated with the first duct adapter and disposed between the inner surface of the plurality of tines and one of the inner surface or outer surface of the first duct adapter toward which the plurality of tines flexibly bends.

In another embodiment, the height of the pressure ridge is such that the circumference of the surface of the second duct adapter that presses against the plurality of tines is equal to or greater than the circumference defined by a surface of the pressure ridges against which the second duct adapter presses. Thus, the height of the pressure ridge is sufficient to press against the plurality of tines and cause them to bend completely inwardly against the first duct and the first duct adapter inner surface.

As indicated above, the first duct to which the first duct adapter may be mated may comprise, for example, a standard flexible helical clothes dryer hose duct having helical wires embedded in or inside the duct material. The helical wires provide a series of wires along the length of the duct, which may be used to advantage to secure the duct in place and prevent the duct from being removed when it is being clamped down upon. In another aspect, the plurality of helical tines may also comprise one or more pressure ridges that are configured to be positioned between the helical wires of the flexible duct. For example, the pressure ridges may be separated by sufficient space that when the plurality of tine clamps down on the helical wired dryer duct the pressure ridges fit in between one or more of the wires of the flexible duct, thereby preventing the wires from slipping back past the pressure ridges and dislodging the flexible duct from the first duct adapter.

In yet another aspect, the plurality of tines may further comprise a first locking ridge disposed on an outer surface of the plurality of tines, wherein the second duct adapter coupling end comprises a second locking ridge circumferentially disposed around one of the second duct adapter inner surface and second duct adapter outer surface that engages the plurality of tines, and wherein the first locking ridge is configured to forcibly pass over the second locking ridge and reversibly lock the first duct adapter and second duct adapter together in a concentric mating position. The locking ridge disposed on the plurality of tines and the corresponding locking ridge on the second duct adapter function as a detent that allows the second duct adapter to be reversibly positioning and holding the second duct adapter in place when it is mated with the first duct adapter, and then allowing the first duct adapter and second duct adapter to be released when force is applied to pull them apart.

In another embodiment, one of the first locking ridge and second locking ridge comprises two opposing ridges defining a channel between the two opposing ridges into which channel the other of the first locking ridge and second locking ridge engages. In yet another embodiment, the ridge may comprise an edge defined by a channel that is formed in one or the other of the plurality of tines or the second duct adapter. In this embodiment, one of the first duct adapter or outer surface of the plurality of tines comprises a ridge, while the other comprises a channel into which the ridge reversibly locks.

In another embodiment, one of the first duct adapter and second duct adapter comprises a 90 degree angle or L-shape between a coupling end and duct end. In this embodiment, the duct coupling of the present invention can comprise an L-shaped duct that allows one end of the duct coupling to be directly inserted into a second duct (such as a clothes dryer exhaust duct), form an L-shaped joint, and then join the other end of the duct coupling to a first duct (such as a helical wired clothes dryer duct) in a perpendicular direction, as illustrated in the accompanying drawings.

In another aspect, the present invention further provides a flange on one of either the first duct adapter or second duct adapter to stop movement of first duct adapter and second duct adapter when positioned together. Thus, one of the first duct adapter and second duct adapter may comprises a flange against which the other of the first duct adapter and second duct adapter abuts to stop axial movement of the first duct adapter and second duct adapter relative to each other. In one particular embodiment, the flange is disposed around the circumference of one of the first duct adapter and second duct adapter. In other embodiments, the flange may be disposed around only a part of the circumference of one of the first duct adapter and second duct adapter.

One particular embodiment of the present invention is shown and described in the accompanying FIGS. 1-6, which shows a dryer duct coupling for reversibly joining a clothes dryer vent to a helical coiled dryer duct that is then connected to a wall duct. The dryer duct coupling comprises two main parts, a first duct adapter 10 (shown in detail in FIGS. 1-3) and a second duct adapter 20 (shown in detail in FIGS. 4-6).

FIG. 1 is a cross-sectional view of the dryer duct coupling, having a first duct adapter 10, a second duct adapter 20 and helical dryer hose 30, (including helical wire 30a) all of which are coupled together to join a vent or the rear of a clothes dryer (not shown) to a wall vent (not shown). As shown in FIG. 1, the first duct adapter 10 has an inner surface 11, outer surface 12, first duct end 13 and first coupling end 14. The first duct adapter first duct end 13 is configured to concentrically mate with the helical dryer hose duct 30, for example, with the helical dryer hose duct 30 fitting inside the first duct end 13. The first duct adapter further includes a plurality of tines 15a and 15b that extend from the first coupling end 14 and bend inwardly toward the inner surface 11 of the first duct adapter.

FIG. 1 also shows a second duct adapter 20 comprising a duct having an inner surface 21, outer surface 22, second duct end 23 and second coupling end 24, wherein the second duct end 23 is configured to mate with a vent on the rear of a clothes dryer (not shown). The first coupling end 14 is configured to concentrically mate with the second coupling end 24, for example, by sizing the second coupling end 24 to fit inside the first coupling end 14.

In accordance with the embodiment shown in FIG. 1, the first coupling end 14 further comprises a plurality of tines 15a and 15b configured to flexibly bend toward the inner surface 11 of the first duct adapter and over the end 31 of the helical dryer hose duct 30, which is concentrically mated with the first duct adapter 10 and is disposed between an inner surface 16 of the plurality of tines (i.e., the surface that is facing towards the inner surface 11 of the first duct adapter), and the inner surface 11 of the first duct adapter 10 toward which the plurality of tines flexibly bends.

Also shown in FIG. 1, the second duct adapter 20 second coupling end 24 is configured to concentrically mate with the first duct adapter 10 first coupling end 14 so as to force the plurality of tines to clamp against the helical dryer hose duct 30 having an end 31 that is disposed between the inner surface 16 of the plurality of tines 15a, 15b, and one of the inner surface 11 of the first duct adapter 10 toward which the plurality of tines flexibly bends. Thus, when the second adapter 20 is inserted into the end of the first adapter 10, the coupling end 24 of the second adapter 20 engages the plurality of tines 15a, 15b and pushes the tines 15a, 15b toward the inner surface 11 of the first adapter 10, causing the tines 15a, 15b to clamp down on the helical dryer hose duct that is positioned between tines 15a, 15b and the inner surface 11.

FIG. 2 shows a perspective view from the coupling end 14 of the first duct adapter 10 with a plurality of tines 15a, 15b disposed on the coupling end 14 of the first duct adapter. In this particular embodiment, the plurality of tines 15a, 15b connected to the first duct adapter 10 coupling end 14 are configured to bend inwardly toward the inner surface 11, for example, by bending at flexible hinge 14a. FIG. 2 further shows details of the plurality of tines 15a, 15b, including friction ridges 18.

Figure 3:
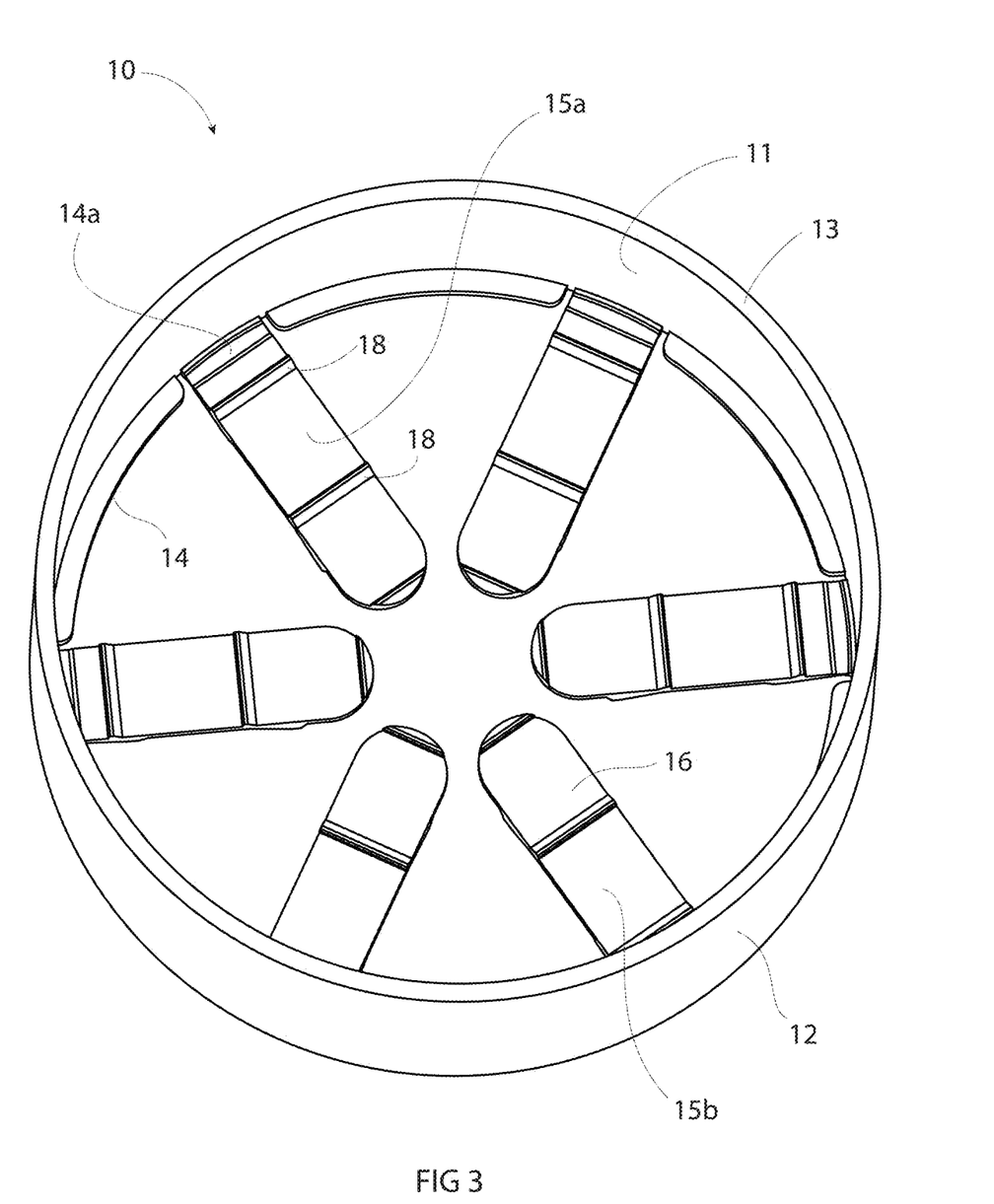
FIG. 3 shows a perspective view of a duct end of a first adapter.

FIG. 3 shows a perspective view from the duct end 13 of the first duct adapter 10 with a plurality of tines 15a, 15b disposed on the coupling end 14 of the first duct adapter 10. Also shown are pressure ridges 18, which engage and clamp down on the helical dryer hose duct 30 to retain it within the first duct adapter 10. As more particularly shown in FIG. 4, the plurality of tines 15a, 15b may be joined to the coupling end 14 of the first duct adapter 10 via a flexible hinge 14a, which may comprise a thinned region of flexible material.

Figure 5:
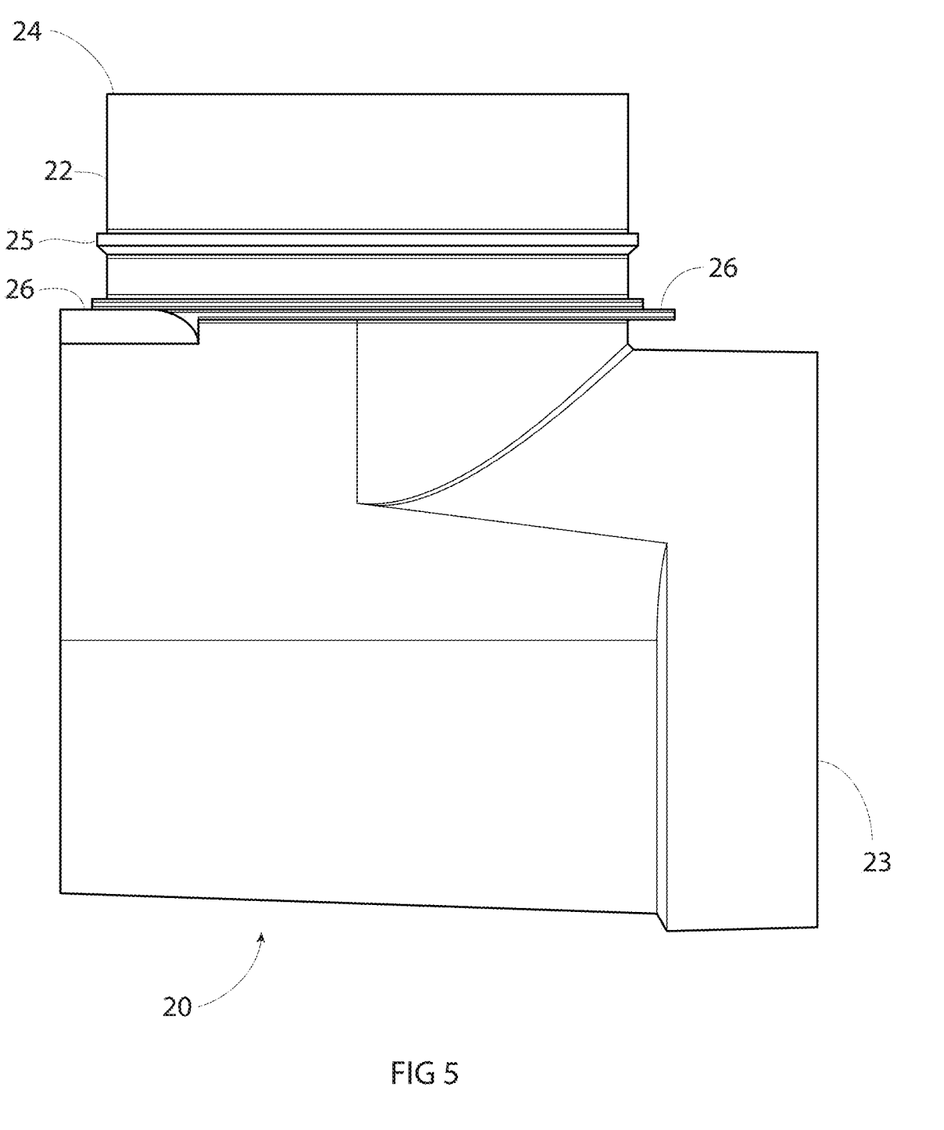
FIG. 5 shows a side view of a second adapter that is configured to join together with the first adapter.
Figure 6:
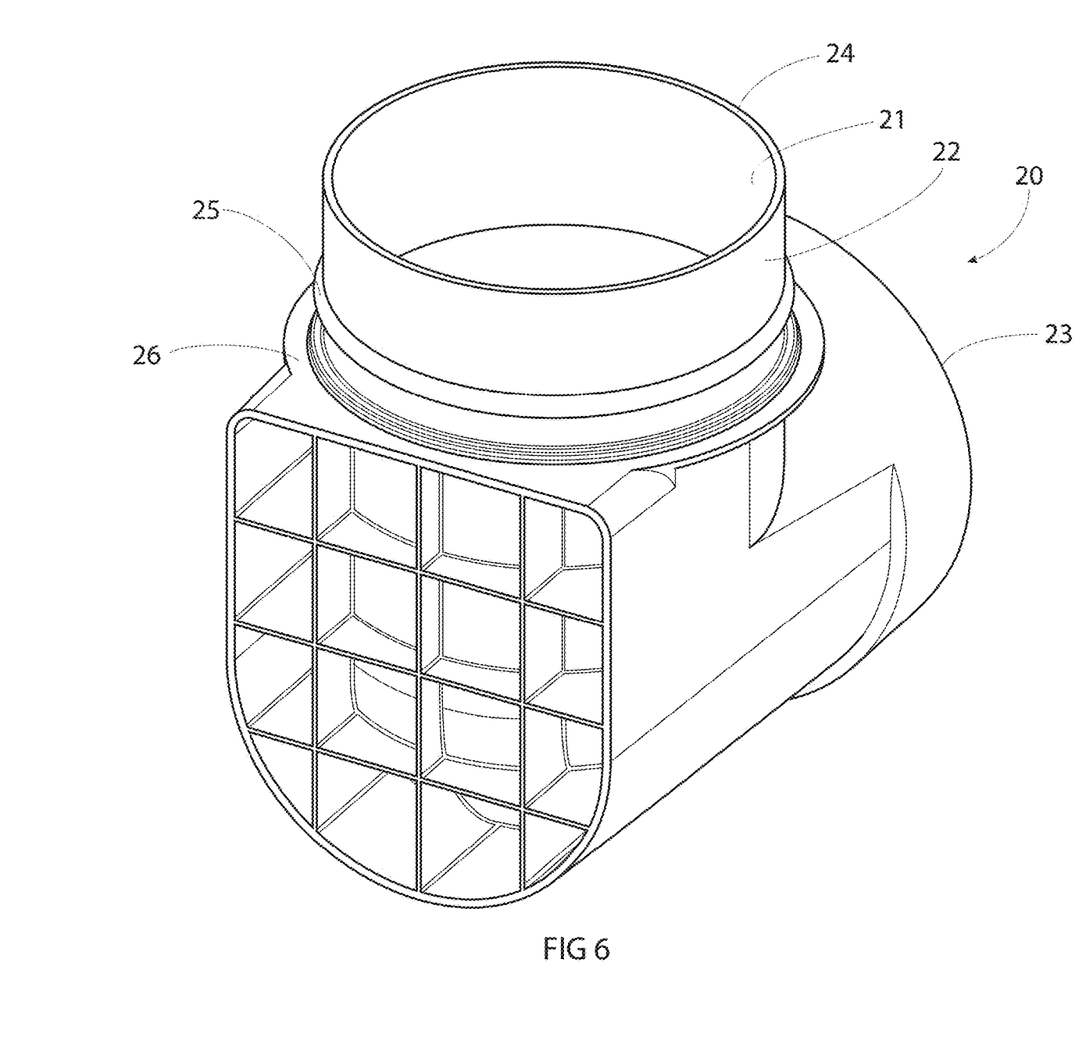
FIG. 6 shows a perspective view of the second adapter.
Figure 7:
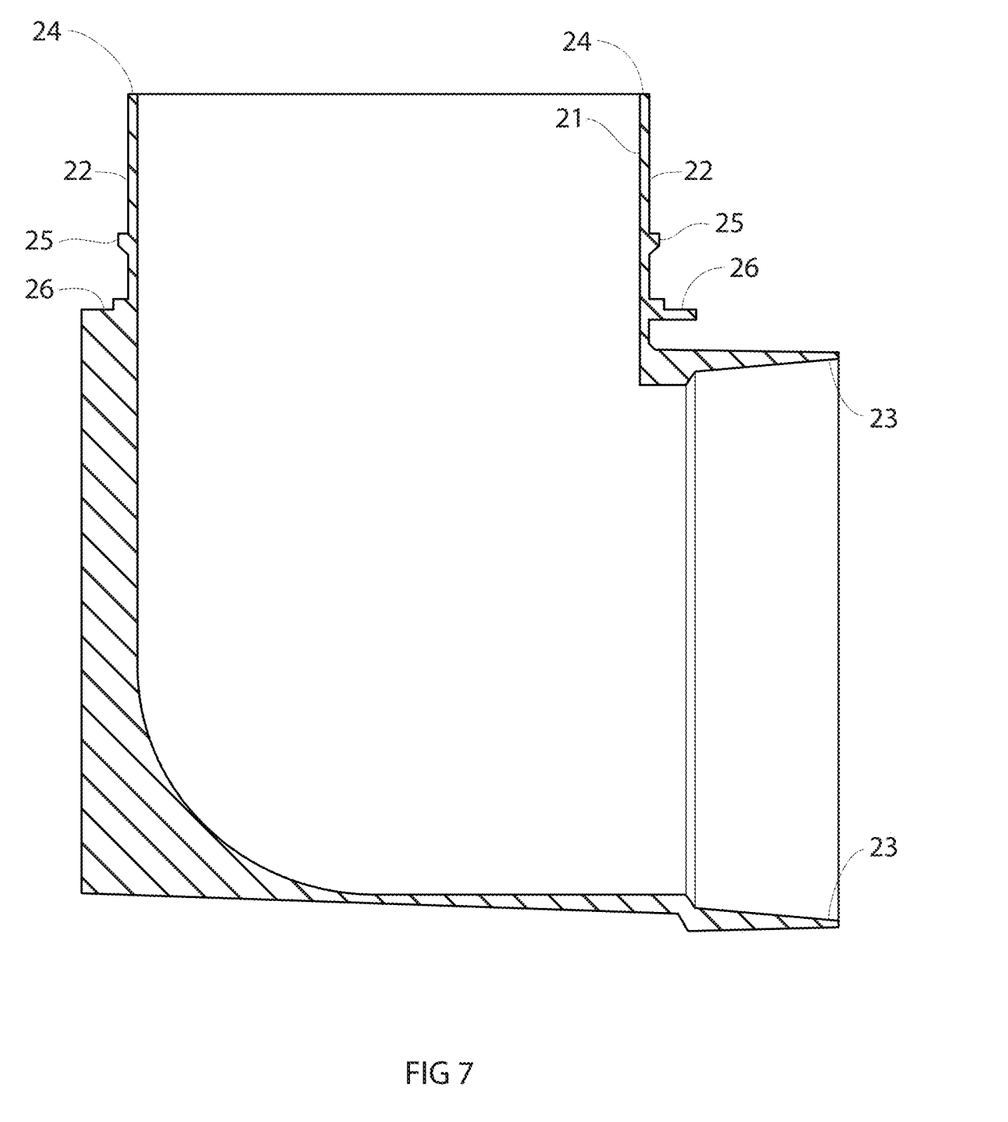
FIG. 7 shows a cross-sectional view of the second adapter.

FIGS. 5, 6 and 7 show the second duct adapter 20, which in the embodiment shown in the drawings is configured to be inserted inside the first duct adapter 10, as shown in FIG. 1. The second duct adapter comprises a duct having an inner surface 21, outer surface 22, second duct end 23 and second coupling end 24, wherein the second duct end 23 is configured to mate with a vent on the rear of a clothes dryer (not shown). The first coupling end 14 is configured to concentrically mate with the second coupling end 23, for example, by sizing the second coupling end 23 to fit inside the first coupling end 14.

As shown in FIGS. 5, 6 and 7, the second duct adapter 20 has a locking ridge 25 circumferentially disposed around the exterior surface 22 of the coupling end 24. The locking ridge 25 is configured to forcibly pass over the matching locking ridges 19 on the plurality of tines 15a, 15b to reversibly lock the first duct adapter 10 and second duct adapter 20 together in a concentric mating position.

In another aspect of the invention, FIGS. 1-4 show the inner surface 16 of the plurality of tines 15a, 15b, having one or more friction ridge 18 configured to clamp against the helical dryer vent duct 30 that is concentrically mated with the first duct end 13 and disposed between the inner surface 16 of the plurality of tines 15a, 15b and one of the inner surface 11 of the first duct adapter 10 toward which the plurality of tines 15a, 15b flexibly bends.

Figure 4:
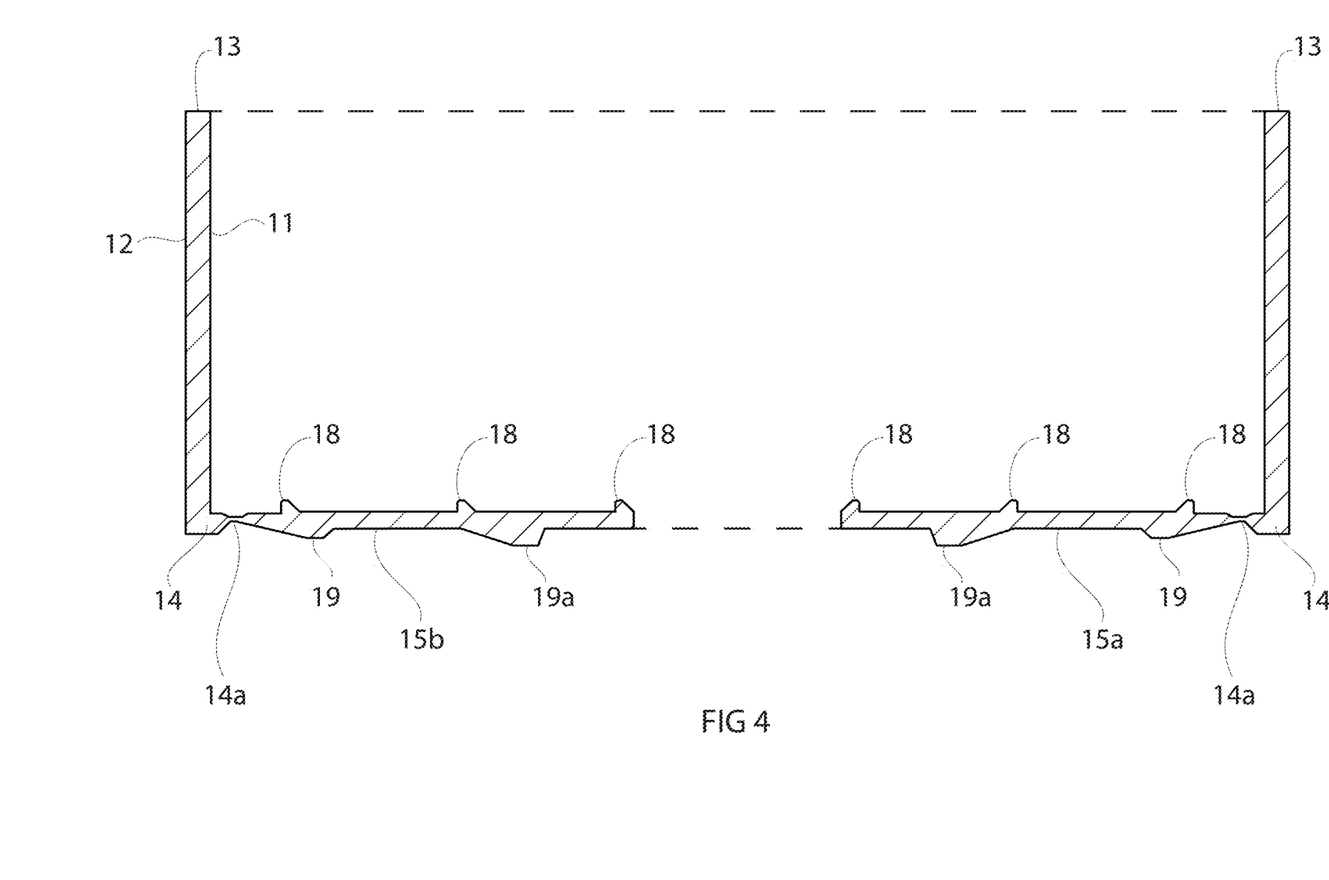
FIG. 4 shows cross-sectional view of a first adapter.

FIGS. 1, 2 and 4 further show that the plurality of tines 15a, 15b may also include one or more pressure ridges 18, which may be configured to cause the plurality of tines to frictionally engage the first duct concentrically mated with the first duct adapter 10 and disposed between the inner surface 16 of the plurality of tines 15a, 15b and the inner surface 11 of the first duct adapter 10 toward which the plurality of tines 15a, 15b flexibly bends. In some embodiments, the pressure ridges are configured to be positioned between the helical wires 30a of the flexible duct.

In another embodiment, as shown in FIG. 1, the plurality of tines 15a, 15b may also include a first locking ridge 19 and second locking ridge 19a, 19b on the outer surface 17 of the plurality of tines 15a, 15b, which together define a channel between the two opposing ridges into which channel the locking ridge 25 on the second duct adapter reversibly locks into place.

FIGS. 5, 6 and 7 further show that the second duct adapter 20 comprises a flange 26 against which the coupling end 14 of the first duct adapter 10 abuts in order to stop axial movement of the first duct adapter and second duct adapter relative to each other. The flange 26 is shown disposed around the circumference of second duct adapter 20.

Those skilled in the art will appreciate numerous modifications which can be made without departing from the scope and spirit of the present invention. The appended claims are intended to cover such modifications.

Figure 8:
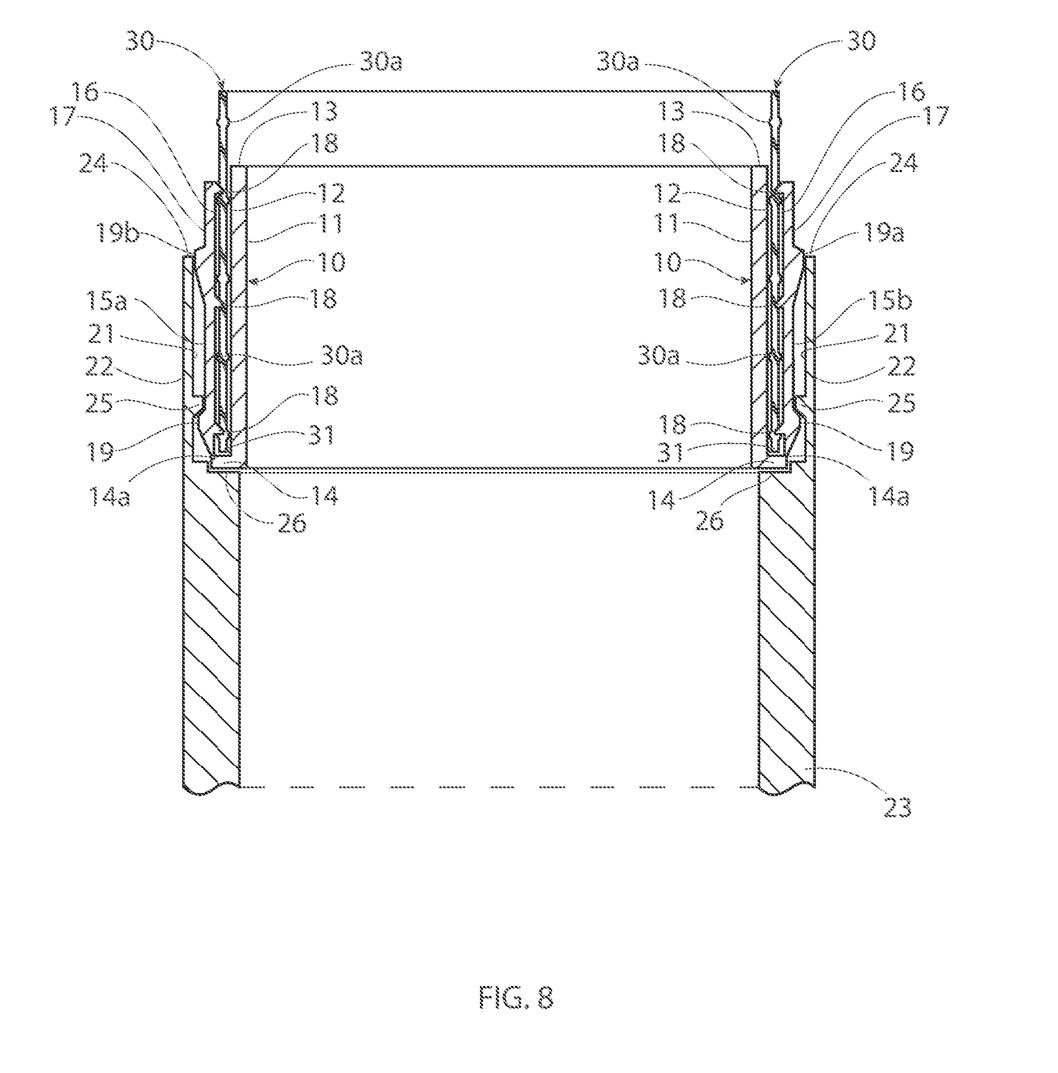
FIG. 8 shows a cross-sectional view of another embodiment of a duct coupling system with the tines bending outwards.

FIG. 8 shows an embodiment of the invention in which the plurality of tines is configured to flexibly bend toward the outer surface of the first duct adapter, such that the first duct that is concentrically mated with the first duct adapter is disposed between an inner surface of the plurality of tines and the outer surface of the first duct adapter toward the outer surface toward which the plurality of tines flexibly bends. In this alternative embodiment the plurality of tines bends outwardly toward the outer surface of the first duct adapter and the second duct adapter is configured to fit outside the first duct adapter and concentrically mate with the outer surface of the first duct adapter. The numbering of elements shown in FIG. 8 correspond to the numbering of corresponding elements shown in FIG. 1.

Figure 9:
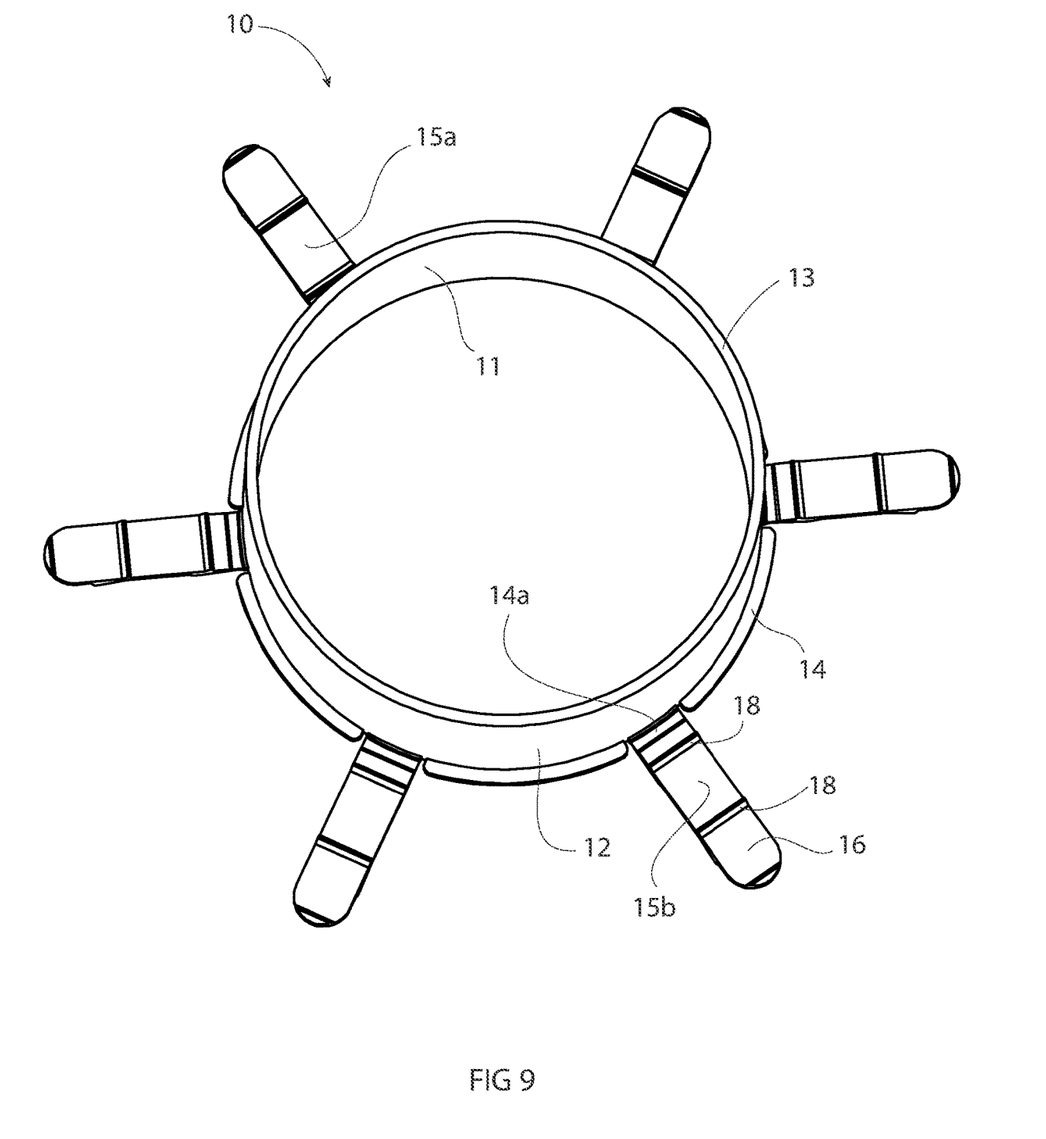
FIG. 9 shows a perspective view from the duct end of the embodiment of the duct coupling system shown in FIG. 8.

FIG. 9 shows a perspective view from the duct end 13 of the first duct adapter 10 with a plurality of tines 15a, 15b disposed on the coupling end 14 of the first duct adapter. Also shown are pressure ridges 18 (shown as dotted lines on the opposite side of the tines), which engage and clamp down on the helical dryer hose duct 30 to retain it on the outside of the first duct adapter 10. The plurality of tines 15a, 15b may be joined to the coupling end 14 of the first duct adapter 10 via a flexible hinge 14a, which may comprise a thinned region of flexible material.

The invention claimed is:

1. A duct coupling for reversibly joining a first duct and a second duct, comprising:
    a first duct adapter having a first duct adapter inner surface, a first duct adapter outer surface, a first duct adapter end and a first duct adapter coupling end, wherein the first duct adapter end is configured to concentrically mate with the first duct;
    a second duct adapter having a second duct adapter inner surface, a second duct adapter outer surface, a second duct adapter end and a second duct adapter coupling end, wherein the second duct adapter end is configured to mate with the second duct, and wherein the first duct adapter coupling end is configured to concentrically mate with the second duct adapter coupling end;
    wherein the first duct adapter coupling end comprises a plurality of tines configured to flexibly bend toward the first duct adapter inner surface, such that the first duct that is concentrically mated with the first duct adapter end is disposed between an inner surface of the plurality of tines and the inner surface of the first duct adapter toward which the plurality of tines flexibly bends;
    wherein the second duct adapter coupling end is configured to concentrically mate with the first duct adapter coupling end so as to force the plurality of tines to clamp against the first duct that is disposed between the inner surface of the plurality of tines and the inner surface of the first duct adapter toward which the plurality of tines flexibly bends; and
    wherein the plurality of tines bends inwardly toward the inner surface of the first duct adapter and the second duct adapter is configured to fit inside the first duct adapter and concentrically mate with the inner surface of the first duct adapter.

2. The duct coupling according to claim 1, wherein the plurality of tines are connected to the first duct adapter coupling end via a flexible hinge.

3. The duct coupling according to claim 2, wherein the flexible hinge further comprises a thinned region of flexible material.

4. The duct coupling according to claim 3, wherein the plurality of tines are manufactured in a position pointing radially inwardly relative to the first duct adapter.

5. The duct coupling according to claim 1, further comprising one or more pressure ridges disposed on the inner surface of the plurality of tines, the one or more pressure ridges configured to cause the plurality of tines to frictionally engage the first duct concentrically mated with the first duct adapter end, the first duct disposed between the inner surface of the plurality of tines and the inner surface of the first duct adapter toward which the plurality of tines flexibly bends.

6. The duct coupling according to claim 5, wherein the first duct comprises a flexible duct having helical wires.

7. The duct coupling according to claim 6, wherein the one or more pressure ridges are configured to be positioned between the helical wires of the flexible duct.

8. The duct coupling according to claim 1, wherein the plurality of tines further comprises a first locking ridge disposed on an outer surface of the plurality of tines, and wherein the second duct adapter coupling end comprises a second locking ridge circumferentially disposed around the second duct outer surface that engages the plurality of tines, wherein the first locking ridge is configured to forcibly pass over the second locking ridge and reversibly lock the first duct adapter and second duct adapter together in a concentric mating position.

9. The duct coupling according to claim 8, wherein the plurality of tines comprises the first locking ridge and a second outer surface locking ridge, the first locking ridge and the second outer surface locking ridge comprising opposing ridges and defining a channel between the opposing ridges into which channel the second locking ridge of the second duct adapter coupling end engages.

10. The duct coupling according to claim 1, wherein one of the first duct adapter and second duct adapter comprises a 90 degree angle between a coupling end and duct end.

11. The duct coupling according to claim 1, wherein the second duct adapter comprises a flange against which the first duct adapter abuts to stop axial movement of the first duct adapter and second duct adapter relative to each other.

12. The duct coupling according to claim 11, wherein the flange is disposed around a circumference of the second duct adapter.

13. A duct coupling for reversibly joining a first duct and a second duct, comprising:
    a first duct adapter having a first duct adapter inner surface, a first duct adapter outer surface, a first duct adapter end and a first duct adapter coupling end, wherein the first duct adapter end is concentrically mateable with the first duct;
    a second duct adapter including a second duct adapter end and a second duct adapter coupling end, wherein the second duct adapter end is mateable with the second duct, and wherein the first duct adapter coupling end is concentrically mateable with the second duct adapter coupling end;
    wherein the first duct adapter coupling end comprises a plurality of tines flexibly bendable toward the inner surface of the first duct adapter, such that the first duct that is concentrically mated with the first duct adapter end is disposed between an inner surface of the plurality of tines and the inner surface of the first duct adapter toward which the plurality of tines flexibly bends;
    wherein the second duct adapter coupling end is concentrically mateable with the first duct adapter coupling end to force the plurality of tines to clamp against the first duct that is disposed between the inner surface of the plurality of tines and the inner surface of the first duct adapter toward which the plurality of tines flexibly bends; and
    wherein the plurality of tines bends inwardly toward the inner surface of the first duct adapter and the second duct adapter is configured to fit inside the first duct adapter and concentrically mate with the inner surface of the first duct adapter.

14. The duct coupling according to claim 13, wherein the inner surface of one or more of the plurality of tines further comprises at least one pressure ridge, wherein the at least one pressure ridge causes the plurality of tines to frictionally engage the first duct concentrically mated with the first duct adapter end and disposed between the inner surface of the plurality of tines and the inner surface of the first duct adapter toward which the plurality of tines flexibly bends.

15. A duct coupling for reversibly joining a first duct and a second duct, comprising:
- a first duct adapter having a first duct adapter inner surface, a first duct adapter outer surface, a first duct adapter end and a first duct adapter coupling end, wherein the first duct adapter end is concentrically mateable with the first duct;
- a second duct adapter including a second duct adapter end and a second duct adapter coupling end, wherein the second duct adapter end is mateable with the second duct, and wherein the first duct adapter coupling end is concentrically mateable with the second duct adapter coupling end;
- wherein the first duct adapter coupling end comprises a plurality of tines flexibly bendable toward the outer surface of the first duct adapter, wherein the plurality of tines further comprises a first locking ridge disposed on an outer surface of the plurality of tines, such that the first duct that is concentrically mated with the first duct adapter end is disposed between an inner surface of the plurality of tines and the outer surface of the first duct adapter toward which the plurality of tines flexibly bends; and
- wherein the second duct adapter coupling end comprises a second locking ridge circumferentially disposed around an inner surface of the second duct adapter that engages the plurality of tines, wherein the first locking ridge is configured to forcibly pass over the second locking ridge and reversibly lock the first duct adapter and second duct adapter together in a concentric mating position; and
- wherein the plurality of tines bends inwardly toward the outer surface of the first duct adapter and the second duct adapter is configured to fit outside the first duct adapter and concentrically mate with the outer surface of the first duct adapter.

16. The duct coupling according to claim 15, wherein the inner surface of one or more of the plurality of tines further comprises at least one pressure ridge, the at least one pressure ridge causing the plurality of tines to frictionally engage the first duct concentrically mated with the first duct adapter end, the first duct disposed between the inner surface of the plurality of tines and the outer surface of the first duct adapter toward which the plurality of tines flexibly bends.

* * * * *